US006167868B1

(12) United States Patent
Kleczka et al.

(10) Patent No.: US 6,167,868 B1
(45) Date of Patent: Jan. 2, 2001

(54) METHOD FOR DETERMINING IGNITION ANGLES FOR INDIVIDUAL CYLINDERS IN A MULTICYLINDER INTERNAL COMBUSTION ENGINE

(75) Inventors: Wilfried Kleczka; Stefan Krebs, both of Regensburg (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/162,471

(22) Filed: Sep. 28, 1998

(30) Foreign Application Priority Data

Sep. 26, 1997 (DE) .............................. 197 42 630

(51) Int. Cl.$^7$ ........................................ F02P 5/00
(52) U.S. Cl. ................ 123/406.21; 123/406.35
(58) Field of Search ................ 123/406.21, 406.24, 123/406.29, 436, 406.35

(56) References Cited

U.S. PATENT DOCUMENTS

| 4,268,910 | * | 5/1981 | Omori et al. ........................ 364/431 |
| 4,413,599 | * | 11/1983 | Shigematsu et al. .............. 123/406.35 |
| 4,428,344 | * | 1/1984 | Focht ................................. 123/406.35 |
| 4,472,776 | * | 9/1984 | Deleris et al. ..................... 364/431.12 |
| 4,631,680 | * | 12/1986 | Korb et al. ........................ 364/431.05 |
| 4,811,714 | * | 3/1989 | Akasu ..................................... 123/425 |
| 4,960,094 | * | 10/1990 | Koike et al. ............................ 123/425 |
| 5,003,951 | * | 4/1991 | Komurasaki et al. .................. 123/425 |
| 5,421,304 | * | 6/1995 | Gibtner et al. ......................... 123/425 |
| 5,657,230 | * | 8/1997 | Hess et al. ............................. 364/431 |

* cited by examiner

Primary Examiner—Noah P. Kamen
Assistant Examiner—Mahmoud M Gimie
(74) Attorney, Agent, or Firm—Herbert L. Lerner; Laurence A. Greenberg; Werner H. Stemer

(57) ABSTRACT

A method for determining ignition angles for individual cylinders in a multicylinder internal combustion engine forms the ignition angles for the individual cylinders, based on values of a basic family of characteristics ($KF_B$) which applies to all cylinders, as a function of a knocking behavior of the internal combustion engine on the basis of a first (fast) and second (slow) adaptation loop. Once the internal combustion engine has been stopped, the values that are present are used in a third adaptation loop to form a family of characteristics ($KF_3$) which is applicable to all cylinders (z), and a shift value ($ZW_3(z)$) for each cylinder. These are stored in a non-volatile manner.

8 Claims, 1 Drawing Sheet

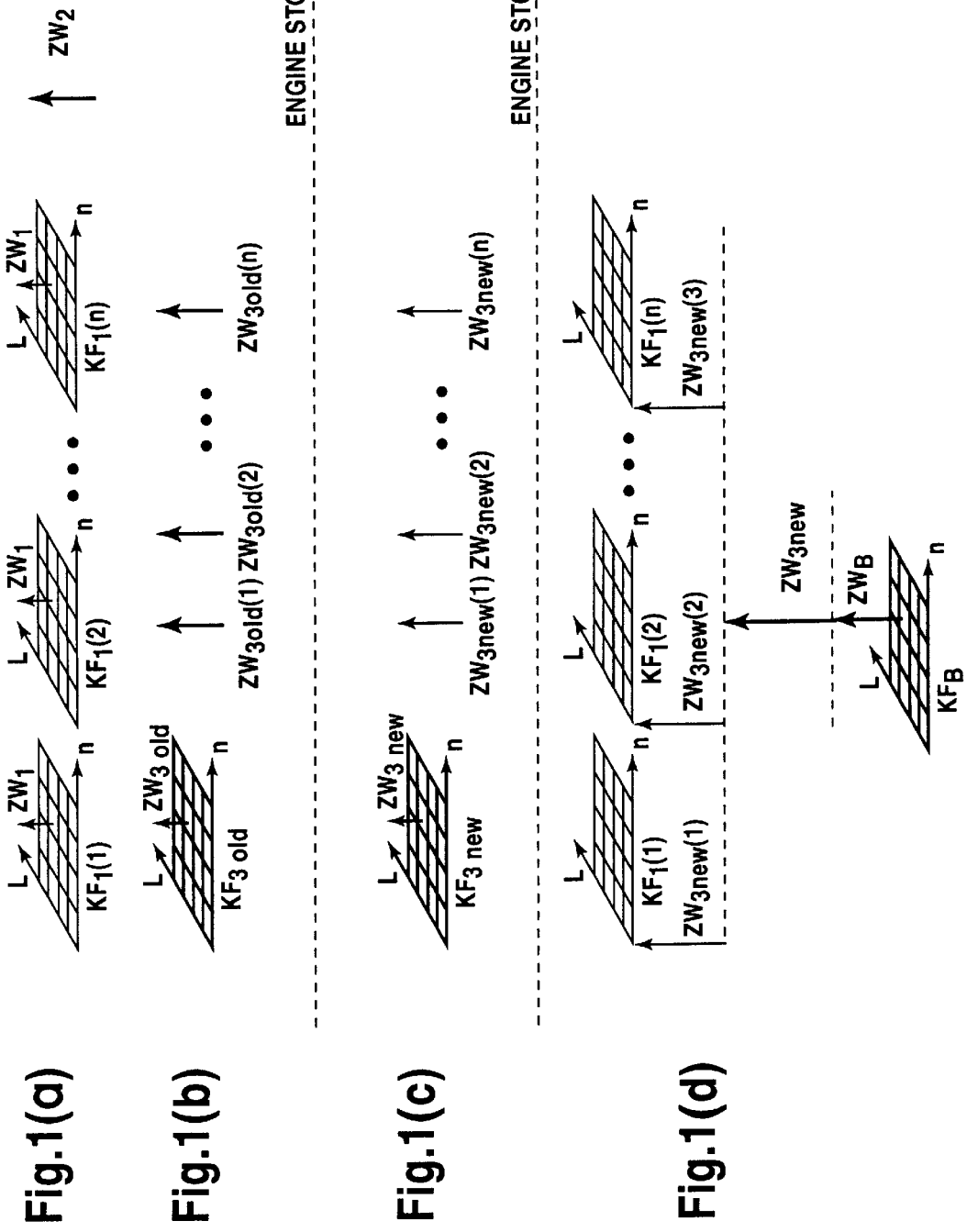

METHOD FOR DETERMINING IGNITION ANGLES FOR INDIVIDUAL CYLINDERS IN A MULTICYLINDER INTERNAL COMBUSTION ENGINE

BACKGROUND OF THE INVENTION

Field of the Invention

The invention relates to a method for determining ignition angles for individual cylinders in a multicylinder internal combustion engine, in particular as a function of its knocking behavior. Ignition angles are also referred to as shift values or displacement values. With respect to ignition angles for cylinders, "early direction" means in the direction of early ignition and "late direction" means in the direction of late ignition. Shift values $(ZW_1[KF_1(z)])$ for families of characteristics $(KF_1(z))$, i.e., the characteristic map, for individual cylinders are adjusted in a first adaptation loop, in a "late" direction when engine knocking occurs and in an "early" direction when engine knocking ceases, based on an invariable "global" basic characteristic map or family of characteristics $(KF_B)$ dependent on load (L) and engine speed (n) and associated with all of the cylinders (z). An adaptation loop is also referred to in the art as a regulating process or a control loop. Global shifting by a global shift value $(ZW_2)$ in the "late" direction or back in the "early" direction takes place in a second adaptation loop, when a magnitude of the adjusted ignition angle $(ZW_1)$ (averaged over all of the cylinders) of the first adaptation loop exceeds a predetermined maximum value $(ZW_{1max})$ or is less than a predetermined minimum value $(ZW_{1min})$ at an operating point P(n, L). A third adaptation loop is initiated when the internal combustion engine is stopped. Such a method having a plurality of control loops has been disclosed in U.S. Pat. No. 4,631,680.

The individual control loops—"adaptation loops"—in known knocking control systems operate by using various methods.

For example, if, during engine operation, a knocking event is identified at an operating point P(n, L), which is determined by the load L (=air mass or equivalent variable) and the engine speed n, in a cylinder z in the internal combustion engine, the ignition angle ZW for the relevant cylinder is adjusted, in a first (fast) adaptation loop, in the late direction, independently of the other cylinders, by a specific shift value $ZW_1[KF_1(z)]$ which is stored in a shift characteristic map or family of characteristics $KF_1(z)$ for individual cylinders, independently of the other cylinders, based on a value $ZW_B$ in the family of characteristics, associated with the operating point P, in a basic family of characteristics $KF_B$ which is associated with all of the cylinders z and is invariable—"global". That reduces the probability of knocking combustion occurring in that cylinders. See the FIGURE of the drawing.

In the reference symbols, a subscript digit denotes the number of the adaptation loop and z denotes the cylinder number. Subscript digits or letters without any subsequent bracketed expression (for example $ZW_B$, $ZW_2$) apply "globally" to all cylinder. See the FIGURE of the drawing. Furthermore, in the following text it is assumed that ignition angle shifts in the late direction are provided with negative mathematical signs, and those in the early direction are provided with positive mathematical signs.

When the engine is being operated without knocking, the shift value $ZW_1[KF_1(z)]$ for individual cylinders is adjusted back in the early direction step-by-step (and is stored in the family of characteristics $KF_1(z)$), either until knocking starts to occur again or until the shift value $ZW_1[KF_1(z)]=0$ for individual cylinders is reached.

Upon leaving the current operating point P, the instantaneous adjusted ignition angle $ZW_1[KF_1(z)]$ is stored in the adaptation family of characteristics $KF_1(z)$ for individual cylinders, so that when this operating point is reached again at a later point in time, initial ignition angle control values $ZW_1[KF_1(z)]$ for individual cylinders are available for knocking control.

If, for example, the magnitude of a mean adjusted ignition angle $ZW_1$ (=mean value of the adjusted ignition angles for all of the cylinders at a specific operating point P) exceeds a predetermined maximum value $ZW_{1max}$ then a global shift in the late direction is carried out by a predetermined, global shift value $ZW_2$ with respect to the global basic family of characteristics $KF_B$.

In this way, information that has been learned at an operating point P can also be made usable for operating points that have not yet been passed through and for the other cylinders. Such a situation can occur, for example, after the vehicle has been refueled with fuel of a lower octane rating.

If, during subsequent operation without knocking, the magnitude of the mean adjusted ignition angle $ZW_1$ becomes less than a predetermined minimum value $ZW_{1min}$ then the global shift value $ZW_2$ is slowly reduced again to the value "0". This part of the method is called the "second (slow) adaptation loop".

The current ignition angle ZW(z) of a cylinder z during engine operation is accordingly made up as follows when an operating point change takes place:

$$ZW(z)=ZW_B+ZW_1[KF_1(z)]+ZW_2;$$

that is to say, for example, for cylinder 1:

$$ZW(1)=ZW_B+ZW_1[KF_1(1)]+ZW_2.$$

In the case of the subject matter of U.S. Pat. No. 4,631,680, the ignition angle values which are worked out—"learned"—during engine operation are stored in a non-volatile manner when the internal combustion engine is stopped in order to ensure that initial ignition time control values are immediately available again, once the engine has been started again. This involves a considerable memory requirement.

SUMMARY OF THE INVENTION

It is accordingly an object of the invention to provide a method for determining ignition angles for individual cylinders in a multicylinder internal combustion engine, which overcomes the hereinafore-mentioned disadvantages of the heretofore-known methods of this general type and which processes those data which have been determined in a first and a second adaptation loop during engine operation before storing them, when the internal combustion engine is stopped, in such a way that optimum initial ignition angle control values are available when the engine is next started and as little non-volatile memory as possible is required for storage.

With the foregoing and other objects in view there is provided, in accordance with the invention, a method for determining ignition angles for individual cylinders in a multicylinder internal combustion engine, in particular as a function of knocking behavior of the engine, which comprises adjusting shift values $(ZW_1[KF_1(z)])$ for families of characteristics $(KF_1(z))$, i.e., the characteristic map, for individual cylinders in a first adaptation loop, in a "late" direction when engine knocking occurs and in an "early" direction when engine knocking ceases, based on an invariable "global" basic family of characteristics $(KF_B)$ dependent on load (L) and engine speed (n) and associated with all of the cylinders (z); globally shifting by a global shift value $(ZW_2)$ in the "late" direction or back in the "early" direction, in a second adaptation loop, when a magnitude of the adjusted ignition angle ($ZW_1$), averaged over all of the cylinders, of the first adaptation loop exceeds a predetermined maximum value ($ZW_{1max}$) or is less than a predetermined minimum value ($ZW_{1min}$) at an operating point P(n, L); initiating a third adaptation loop when the internal combustion engine is stopped; using the shift values ($ZW_1$ [$KF_1(z)$]) of the families of characteristics ($KF_1(z)$) for individual cylinders in the first adaptation loop, the global shift value ($ZW_2$) in the second adaptation loop and the families of characteristics and values in the third adaptation loop from a previous running of the engine in the third adaptation loop to form new shift values ($ZW_3[KF_3]$) for a global family of characteristics ($KF_3$) and shift values ($ZW_3$ (z)) for individual cylinders, and storing in a non-volatile manner in the third adaptation loop; and using the values after the engine is started again to form shift values ($ZW_B$ [$KF_B(z)$]) for new "basic families of characteristics" ($KF_B$ (z)) for individual cylinders, and commencing ignition angle determination and knocking control in the new running of the engine using the first and second adaptation loop. See the FIGURE of the drawing.

When the internal combustion engine is turned off, a global shift family of characteristics $KF_3$ and shift values $ZW_3(z)$ for individual cylinders are determined, as explained below, in a computation process which is called the "third adaptation loop" and are stored in a non-volatile manner. See the FIGURE of the drawing at (c). New basic families of characteristics $KF_B(z)$ for individual cylinders are calculated therefrom once the engine has been started again, with which new basic families of characteristics $KF_B(z)$ for engine operation can then be commenced. See the FIGURE of the drawing at (d).

1) Calculation of the shift values $ZW_3(z)$ for individual cylinders in the third adaptation loop:

In accordance with another mode of the invention, after the internal combustion engine has been stopped,
a) the shift values $ZW_1[KF_1(z)]$ of the z adaptation families of characteristics $KF_1(z)$ for individual cylinders in the first adaptation loop,
b) the global shift value $ZW_2$ of the second adaptation loop, and
c) the shift values $ZW_{3old}(z)$ for individual cylinders in the third adaptation loop and from the previous running of the engine are added up, on an operating-point basis, in sum families of characteristics KFAD(z) for individual cylinders:

$$ZW[KFAD(z)]=ZW_1[KF_1(z)]+ZW_2+ZW_{3old}(z).$$

In accordance with a further mode of the invention, after the values are added up, values in the families of characteristics which are associated with all operating points or, only defined operating points (for example only the values in the families of characteristics associated with specific load ranges) in this sum family of characteristics KFAD(z) for individual cylinders are added up, for each cylinder, to form sums SUM(z) for individual cylinders.

In accordance with an added mode of the invention, the only values in the family of characteristics which are considered are those which were adapted, that is to say changed, in all cylinders during the last operation of the engine. The number of values considered in the family of characteristics is denoted by reference symbol ANZ.

The sum $SUM_{min}$ having the smallest magnitude is selected from these sums and the shift value $ZW_{3new}(z)$ for individual cylinders is formed by using the following formula:

$$ZW_{3new}(z)=1/ANZ* [SUM(z)-SUM_{min}]$$

In the case of the cylinder which has the sum SUM(z)= $SUM_{min}$ with the smallest magnitude, this value is thus $ZW_{3new}(z)=0$.

In accordance with an additional mode of the invention, new shift values $ZW_{3new}(z)$ are calculated only when the adaptation families of characteristics $KF_1(z)$ in the first adaptation loop for individual cylinders contain a specific number of points in the family of characteristics which were adapted in all cylinders in the immediately preceding running of the engine. If such specific number of points were not adapted is not the case, the old shift values $ZW_{3old}(z)$ from the previous running of the engine are still used.

2) Calculation of the shift values $ZW_3(KF_3)$ for the global shift family of characteristics $KF_3$ for the third adaptation loop:

Element-by-element averaging (per operating point P) of the values ZW[KFAD(z)] in the sum families of characteristics KFAD(z) for individual cylinders, see above, gives the incremental growth at each operating point P(n, L) for the new global shift family of characteristics $KF_{3new}$ which must be added to the "old" shift value $ZW_{3old}(KF_{3old})$ from the last running of the engine. In that case the cylinder-specific element is eliminated by subtraction of the shift values $ZW_{3new}((z)$ for individual cylinders using the following formula:

$$ZW_{3new}(KF_{3new}) = ZW_{3old}(KF_{3old}) + 1/z*\sum_z [ZW]KFAD(z)] - ZW_{3new}(z)].$$

If an ignition angle shift in the late direction and with a negative mathematical sign is intended, no positive shift values occur in this global shift family of characteristics $KF_{3new}$. If necessary such values would have to be corrected to the value "zero".

This global shift family of characteristics $KF_{3new}$ and the shift values $ZW_{3new}(z)$ for individual cylinders are stored in a non-volatile manner, as already mentioned. See the FIGURE of the drawing at (c).

The families of characteristics $KF_1(z)$ for individual cylinders, which are stored in volatile (and therefore less expensive) memory areas, and the global shift value $ZW_2$ are erased once the calculation process in the third adaptation loop has been carried out.

In accordance with yet another mode of the invention, when the engine is started once again, valid "basic families of characteristics for individual cylinders" $KF_B(z)$ which apply to all of the running of the engine are formed by addition, on the basis of operating points, of the values $ZW_B(KF_B)$ in the global basic family of characteristics $KF_B$, the shift values $ZW_3(KF_3)$ in the global shift family of characteristics $KF_3$ and the shift values $ZW_3(z)$ for individual cylinders:

$$ZW_B[KF_B(z)]=ZW_B(KF_B)+ZW_3(KF_3)+ZW_3(z),$$

on which the ignition angle determination and knocking control are based during the new running of the engine and are carried out using the first and second adaptation loop, as has already been described in the introduction.

Through the use of this strategy, adjusted ignition angles from the second adaptation loop can also assume positive values.

Whenever the engine is running, the adjusted ignition angles in the first and second adaptation loop are initialized with the value "zero".

Other features which are considered as characteristic for the invention are set forth in the appended claims.

Although the invention is described herein as embodied in a method for determining ignition angles for individual cylinders in a multicylinder internal combustion engine, it is nevertheless not intended to be limited to the details given, since various modifications and structural changes may be made therein without departing from the spirit of the invention and within the scope and range of equivalents of the claims.

The construction and method of operation of the invention, however, together with additional objects and advantages thereof will be best understood from the preceding description of specific embodiments.

BRIEF DESCRIPTION OF THE DRAWING

The FIGURE is a graphical illustration of the method according to the invention.

We claim:

1. A method for determining ignition angles for individual cylinders in a multicylinder internal combustion engine, which comprises the steps of:

adjusting shift values ($ZW_1[KF_1(z)]$) for families of characteristics ($KF_1(z)$) for individual cylinders in a first adaptation loop, in a "late" direction when engine knocking occurs and in an "early" direction when engine knocking ceases, based on an invariable "global" basic family of characteristics ($KF_B$) dependent on load (L) and engine speed (n) and associated with all of the cylinders (z);

globally shifting by a global shift value ($ZW_2$) in the "late" direction or back in the "early" direction, in a second adaptation loop, when a magnitude of the adjusted ignition angle ($ZW_1$), averaged over all of the cylinders, of the first adaptation loop exceeds a predetermined maximum value ($ZW_{1max}$) or is less than a predetermined minimum value ($ZW_{1min}$) at an operating point P(n, L);

initiating a third adaptation loop when the internal combustion engine is stopped;

using the shift values ($ZW_1[KF_1(z)]$) of the families of characteristics ($KF_1(z)$) for individual cylinders in the first adaptation loop, the global shift value ($ZW_2$) in the second adaptation loop and the families of characteristics and values in the third adaptation loop from a previous running of the engine in the third adaptation loop to form new shift values ($ZW_3[KF_3]$) for a global family of characteristics ($KF_3$) and shift values ($ZW_3(z)$) for individual cylinders, and storing in a nonvolatile manner in the third adaptation loop; and using the values after the engine is started again to form shift values ($ZW_B[KF_B(z)]$) for new "basic families of characteristics" ($KF_B(z)$) for individual cylinders, and commencing ignition angle determination and knocking control in the new running of the engine using the first and second adaptation loop.

2. The method according to claim 1, which comprises the step of determining the ignition angles as a function of knocking behavior of the engine.

3. The method according to claim 1, which comprises the steps of forming shift values ($ZW_3(z)$) for individual cylinders by adding up:

a) the shift values $ZW_1[KF_1(z)]$ of the z adaptation families of characteristics $KF_1(z)$ for individual cylinders in the first adaptation loop, b) the global shift value $ZW_2$ of the second adaptation loop, and c) the shift values $ZW_{3old}(z)$ for individual cylinders in the third adaptation loop and from the previous running of the engine, on an operating-point basis, in sum families of characteristics (KFAD(z)) for individual cylinders:

$$ZW[KFAD(z)]=ZW_1[KF_1(z)]+ZW_2+ZW_{3old}(z);$$

then adding up all of the values (ZW[KFAD(z)]) of the family of characteristics for the sum family of characteristics (KFAD(z)) for individual cylinders for each cylinder (z), to form sums (SUM(z)) for individual cylinders; and selecting the sum ($SUM_{min}$) having the smallest magnitude from the sums (SUM(z)) and forming the shift value ($ZW_3(z)$) for individual cylinders using the formula:

$$ZW_3(z)=1/ANZ* [SUM(z)-SUM_{min}],$$

where ANZ=the number of values considered in the family of characteristics.

4. The method according to claim 3, which comprises the step of only adding up values (ZW[KFAD(z)]) in families of characteristics associated with defined operating points or specific load ranges in the sum family of characteristics (KFAD(z)) for individual cylinders to form sums (SUM(z)) for individual cylinders.

5. The method according to claim 4, which comprises the step of only considering values (ZW[KFAD(z)]) in the family of characteristics (KFAD(z)) which were adapted in all cylinders during the last operation of the engine.

6. The method according to claim 3, which comprises the step of calculating new shift values ($ZW_{3new}(z)$) only when the adaptation families of characteristics ($KF_1(z)$) for individual cylinders contain a specific number of points ($ZW_1[KF_1(z)]$) in the family of characteristics which were adapted in all cylinders in the immediately preceding running of the engine.

7. The method according to claim 1, which comprises the steps of:

calculating the shift values ($ZW_{3new}(KF_{3new})$) of the global family of characteristics ($KF_{3new}$) by determining the incremental growth in the new global shift family of characteristics ($KF_{3new}$) by element-by-element averaging of the values (ZW[KFAD(z)]) of the sum families of characteristics (KFAD(z)) for individual cylinders for each operating point P(n, L), and eliminating the cylinder-specific element by subtraction of the shift values $ZW_{3new}(z)$ for individual cylinders; and adding the incremental growth to the "old" shift value ($ZW_{3old}$) from the last running of the engine:

$$ZW_{3new}(KF_{3new}) = ZW_{3old}(KF_{3old}) + 1/z * \sum_z [ZW[KFAD(z)] - ZW_{3new}(z)].$$

8. The method according to claim 1, which comprises the steps of, after the engine has been started again, forming new basic families of characteristics ($KF_B(z)$) for individual cylinders by addition on the basis of operating points, of the values ($ZW_B(KF_B)$) in the family of characteristics in the global basic family of characteristics ($KF_B$), the shift values ($ZW_3(KF_3)$) of the global shift family of characteristics ($KF_3$) and the shift values ($ZW_3(z)$) for individual cylinders, and then commencing engine operation:

$$ZW_B[KF_B(z)]=ZW_B(KF_B)+ZW_3(KF_3)+ZW_3(z).$$

* * * * *